C. E. THOMSEN.
VEHICLE WHEEL.
APPLICATION FILED JAN. 13, 1915.

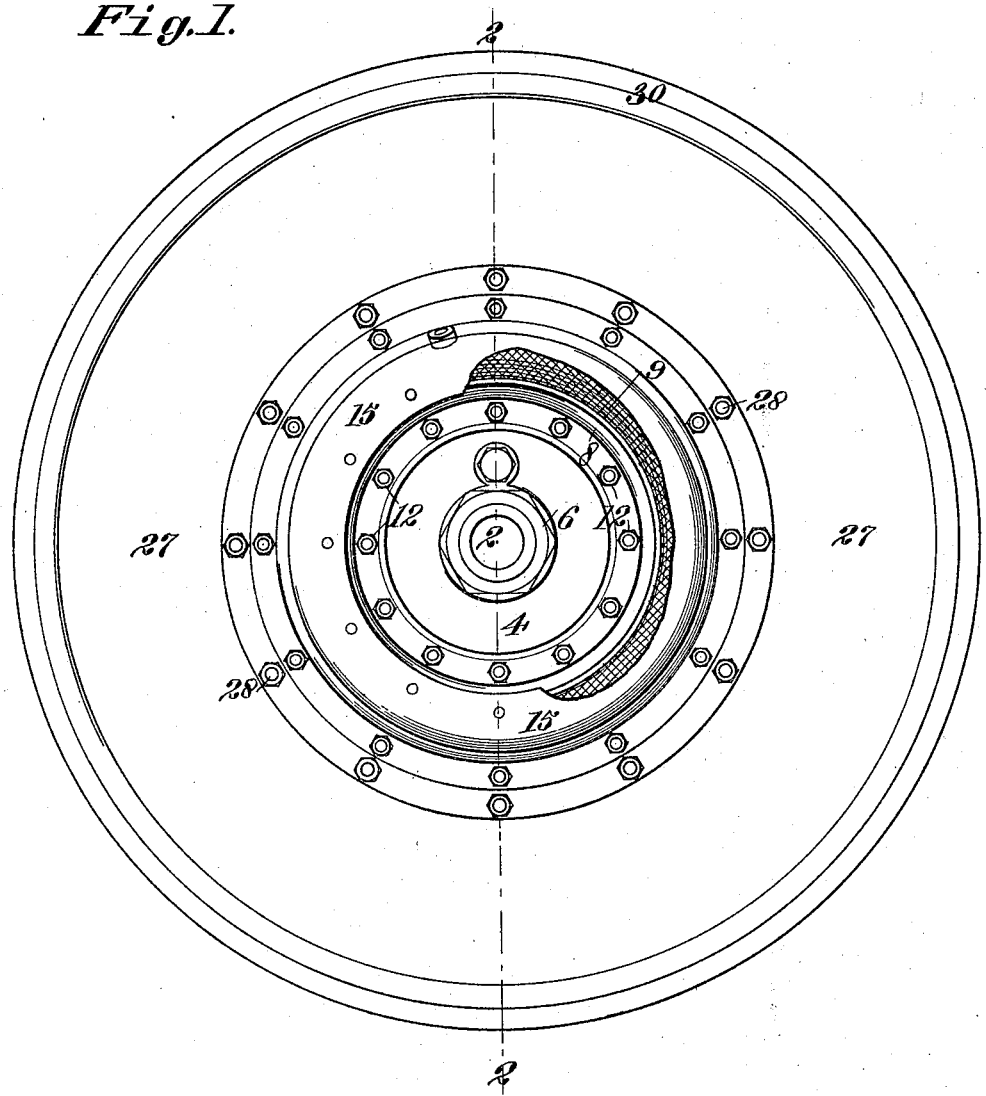

1,188,703.

Patented June 27, 1916.
2 SHEETS—SHEET 2.

WITNESSES:
Charles Pickles
J. H. Herring

INVENTOR
Carl E. Thomsen.
BY G. H. Strong.
ATTORNEY

UNITED STATES PATENT OFFICE.

CARL E. THOMSEN, OF OAKLAND, CALIFORNIA.

VEHICLE-WHEEL.

1,188,703.  Specification of Letters Patent.  Patented June 27, 1916.

Application filed January 13, 1915. Serial No. 1,969.

*To all whom it may concern:*

Be it known that I, CARL E. THOMSEN, a citizen of the United States, residing at Oakland, in the county of Alameda and State of California, have invented new and useful Improvements in Vehicle-Wheels, of which the following is a specification.

This invention relates to vehicle wheels, and pertains especially to a cushion wheel particularly designed for automobiles and possessing the desired degree of resiliency without liability to puncture.

Its objects will be apparent hereinafter.

Figure 3:
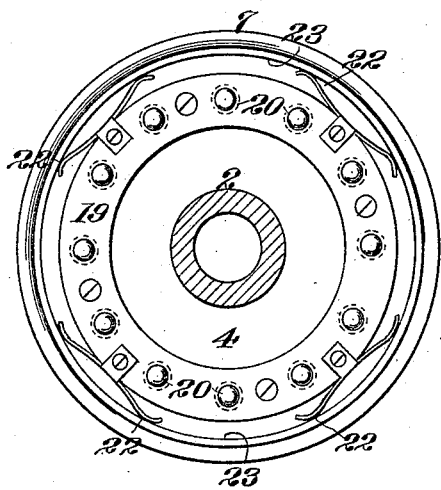
Figure 2:
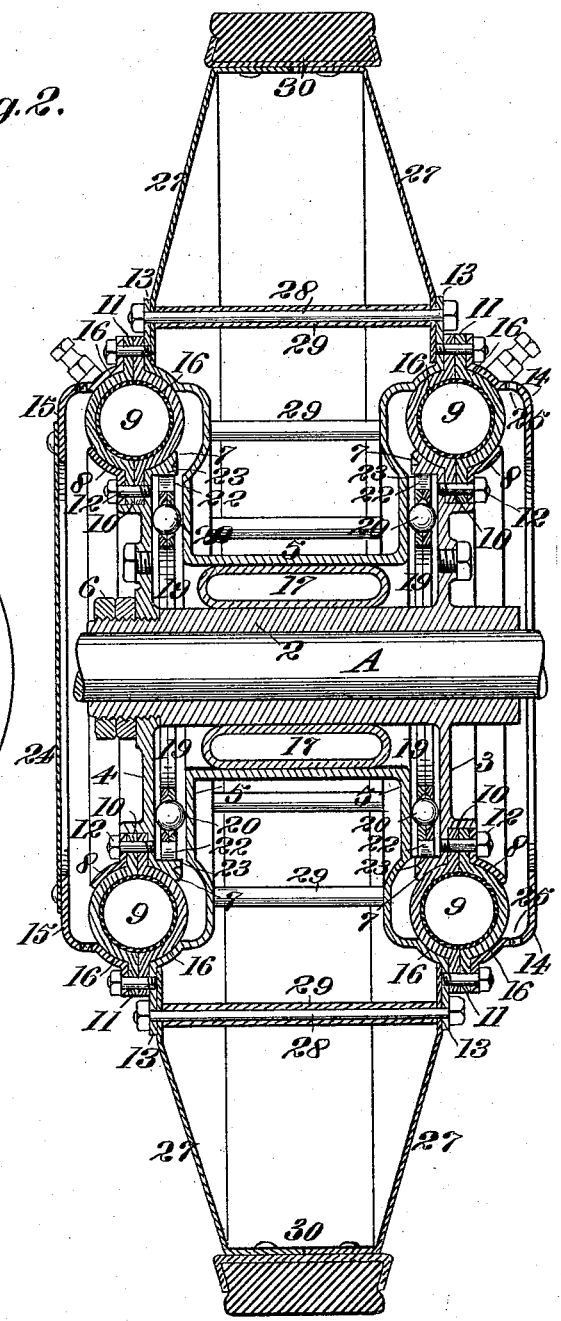

Having reference to the accompanying drawings: Figure 1 is a side elevation partly broken away. Fig. 2 is a vertical transverse section on line 2—2, Fig. 1. Fig. 3 is a side elevation of ring 19.

A represents a wheel spindle or skein designed to receive and form a bearing for the sleeve or inner hub 2. This sleeve or inner hub 2 has a pair of spaced, annular flanges 3—4 between which is slidably mounted the outer floating hub 5, as hereinafter described. The inside flange 3 may be integral with the sleeve or hub 2, while the outer flange 4 is removable and adjustable to permit assembling of the parts; flange 4 being shown as screw-threaded on the sleeve 2 and locked thereto by suitable means, as the lock nut 6.

The flanges 3—4 are provided with the segmental seats 7 which coöperate with the removable seat sections 8 to support the two pneumatic cushions 9. These cushions 9 are made in two parts with the opposed peripheral flanges 10—11; the flanges 10 being clamped between the seat sections 7—8 and held in place by appropriate means, as the stud bolts 12. The outer peripheral flanges 11 of the tubes 9 are adapted to be clamped between the outward extension 13 of the floating hub 5 and the removable guard plates 14—15; guard plate 14 being on the inner end of the hub and guard plate 15 being on the outer end of the hub, and both guard plates and the companion portions of the floating hub 5 being suitably shaped to form seats 16 for the tubes 9. The seats 16 are complementary to the seats 7—8.

The floating hub 5 is of sufficiently greater diameter than the inner hub 2 to allow for proper play of the parts as the tubes 9 may be compressed. If desired, a pneumatic tube 17 may be interposed in the space between the parallel cylindrical portions of the inner hub 2 and the floating hub 5.

In order to maintain the parallelism of the hubs and keep the parts in well adjusted condition and give the wheel practical rigidity there is interposed between the inner vertical faces of the flanges 3—4 and the corresponding surfaces or ends of the floating hub 5 the floating bearing rings 19, each ring 19 being preferably made in two parts to allow the insertion of the anti-friction balls 20 into suitable pockets formed in the ring sections. In other words, each ring 19 is split and formed with conoidal perforations to receive the balls 20; the thickness of the combined sections of the ring being less than the diameter of the balls so that the latter project from opposite sides of the ring and contact with the floating hub 5 in the adjacent surfaces of the flanges 3—4 and yet maintain the bearing rings 19 out of frictional contact with these parts.

In order to maintain the bearing rings 19 approximately concentric at all times with the spindle A and yet allow sufficient freedom of movement of the rings to avoid friction, I have shown appropriate means, as the bow springs 22, which are centrally fastened to the rings 19 and have their curved ends bearing on the circular seat 23 formed on the underside of the seat 7.

A cap 24 may be secured to the outer guard ring 15 to exclude dust from that end, while the inner cap plate 14 may be perforated, as shown at 25, to allow any dust or dirt to escape that might fall into the space inclosed by it.

The remainder of the wheel construction may be of any appropriate design. Preferably the spoke construction embodies two spun metal plates or disks 27 secured to the floating hub 5 by bolts 28 and spacing sleeves 29; the spoke plates 27 being brought together to form a seat for the rim and tread 30.

The construction forms a simple, practical, rigid, cushion wheel possessing all the resiliency of a pneumatic tired wheel without the danger of puncture. The pneumatic tubes 9, by reason of the double flanges 10—11, form a unique connection between the two hubs and yet provide for all the desired cushioning effect. Also this construction of pneumatic cushion, with its double flanges, forms a complete seal against the entry of any dirt or grit into the bearing surfaces within the hub.

By spacing the tubes 9 a considerable distance apart from the true center of the wheel, it gives a substantial brace and support against lateral strains and any tendency of the wheel to dish. The floating bearings eliminate friction and add stability to the wheel and any addition to the stability mentioned is provided by the wide separation of the tubes 9. The inner cushion 17 may not be used except with heavy loads or wheels designed for heavy duty.

It is manifest that various changes in details of construction may be made without departing from the principle of the invention.

Having thus described my invention, what I claim and desire to secure by Letters Patent is—

1. In a wheel construction, the combination of an axle, a sleeve thereon, said sleeve carrying a pair of spaced annular flanges, means in conjunction with the flanges to provide an annular concaved seat for a respective annular pneumatic cushion, annular pneumatic cushions fitting said seats, a floating hub between the flanges and having means in conjunction with it to provide complementary outer seats for said tubes, and yieldably supported ball bearings between the inner hub and the adjacent vertical faces of said annular flanges.

2. In a wheel construction, the combination of an axle, a sleeve thereon, said sleeve carrying a pair of spaced annular flanges, means in conjunction with the flanges to provide an annular concaved seat for a respective annular pneumatic cushion, annular pneumatic cushions fitting said seats, a floating hub between the flanges and having means in conjunction with it to provide complementary outer seats for said tubes, and floating ball bearings between the floating hub and the adjacent vertical faces of said annular flanges, and resiliently supported rings arranged to support the ball bearings.

3. In a wheel construction, a hub adapted to rotate about a spindle, end flanges on the hub, a second hub of substantially U-section encircling the first hub between the flanges and having its side walls extending beyond the latter, cushioning elements interposed between the side walls of the second hub and the flanges, an encircling rim, and spoke plates carried by the rim and secured to the outer edges of the side walls of the second hub outwardly of the cushioning elements.

4. In a wheel construction, a hub adapted to rotate about a spindle, end flanges on the hub, a second hub of substantially U-section encircling the first hub between the flanges and having its side walls extending beyond the latter, cushioning elements interposed between the side walls of the second hub and the flanges, an encircling rim, spoke plates carried by the rim and secured to the outer edges of the side walls of the second hub, and sustaining spacer sleeves interposed between the outer edges of said hub side walls.

5. In a wheel construction, a hub, spaced flanges thereon each having inwardly facing seats, a floating hub interposed between the flanges, cushioning means between the hubs, a rim supported by the floating hub, and ball bearings interposed between the flanges and the floating hub and resiliently supported on the seats of said flanges.

6. In a wheel construction, a hub, spaced flanges thereon each having inwardly facing seats, a floating hub interposed between the flanges, cushioning means between the hubs, a rim supported by the floating hub, ball bearings arranged between the flanges and the floating hub, and rings resiliently supported by the seats of said flanges and holding the ball bearings in position.

In testimony whereof I have hereunto set my hand in the presence of two subscribing witnesses.

CARL E. THOMSEN.

Witnesses:
JOHN H. HERRING,
W. W. HEALEY.

Copies of this patent may be obtained for five cents each, by addressing the "Commissioner of Patents, Washington, D. C."